Patented Oct. 27, 1936

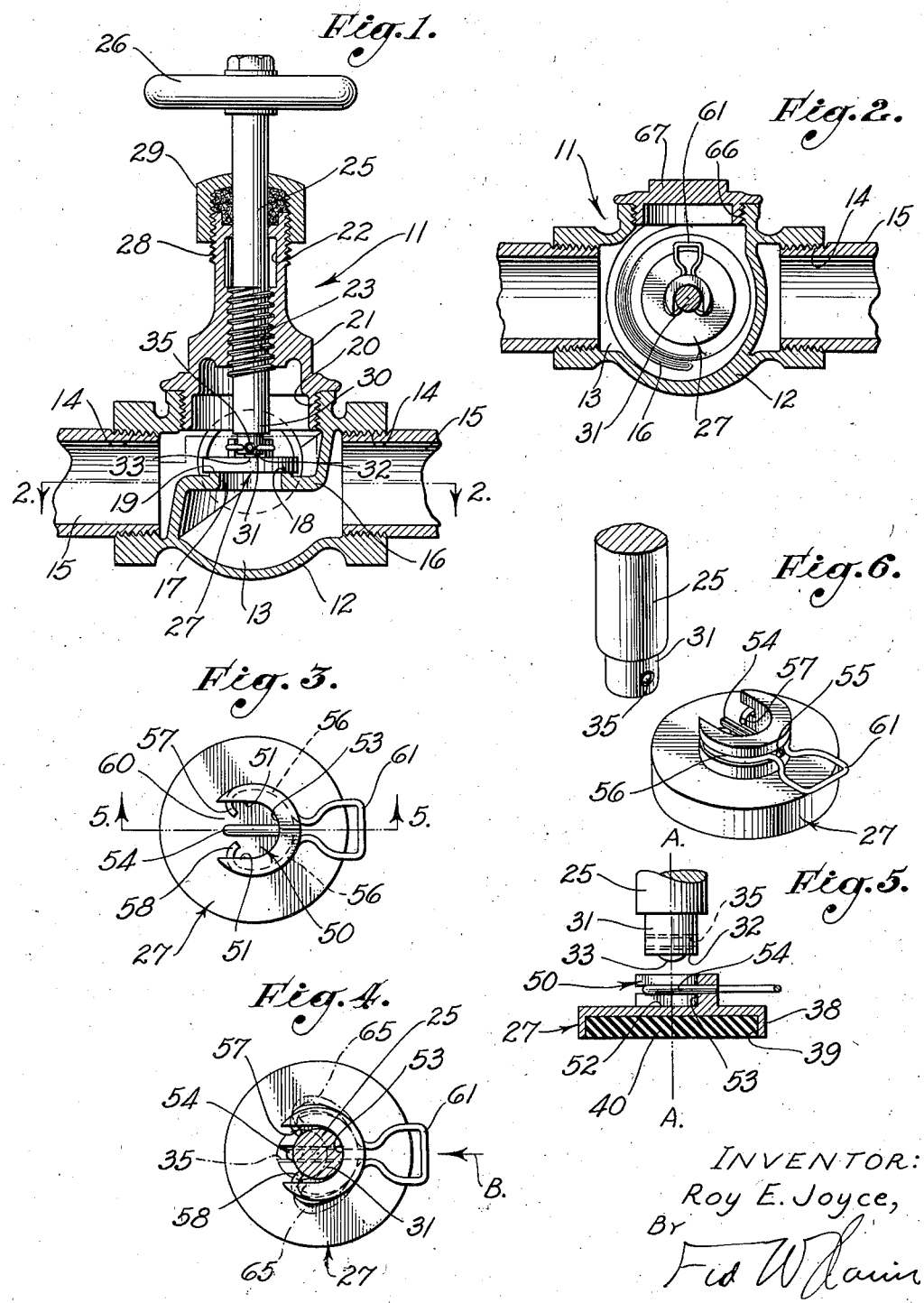

2,059,111

UNITED STATES PATENT OFFICE 2,059,111

DEMOUNTABLE CLOSURE MEMBER FOR VALVES

Roy E. Joyce, Los Angeles, Calif., assignor to Pittsburgh Equitable Meter Company of California, Los Angeles, Calif., a corporation of California Application January 19, 1932, Serial No. 587,493

18 Claims. (Cl. 251—44)

My invention relates to valves, and more particularly to closure members or valve discs forming the closure means of valves.

The various types of valves used at present, including globe valves, angle valves, and cross valves, as well as various types of check valves, to a large extent differ only in general form, the constructional details of the valve seat and valve disc or closure member beng practically universally similar in all of the above-mentioned types. All of the various types of valves are provided with seats surrounding a port formed in a partition or bridge interposed in the fluid passage formed in the valve body. Valve operating members adapted to carry the closure member or valve disc into and out of sealing engagement with the seat are also provided, the valve seat and the closure member constituting the essential parts of the valve in all cases. These closure members are usually connected to the operating member either by a direct threaded connection or by a lock nut rotatably confining a flange of the operating member between a valve disc holder and the lock nut.

Considerable difficulty has always been found in the art in the maintenance of a fluid-tight seal between the closure member and the valve seat, particularly when a closure having a comparatively soft resilient closure disc is utilized. These closure discs, due to excessive wear, must be frequently replaced, which, in the ordinary valve, requires that the valve operating structure must be completely dismantled and the closure member removed therefrom.

To facilitate the replacement of these closure members, it is an object of my invention to provide a closure member adapted for connection to and removal from the operating member through an opening in the valve body, which is normally closed by a plug, without dismantling the operating member from the valve.

It is another object of my invention to provide a closure member of the type described in the above paragraph which is quickly and easily removable from the operating member by a transverse sliding movement of the closure member relative to the operating member produced by a slight manual pressure applied to the closure member.

It is another object of my invention to provide a releasable connection between the operating member and the closure member comprising complemental interlocking parts on the members adapted for interconnection by a relatively transverse sliding movement of the members.

It is another object of my invention to provide a connection of the type described in the above paragraph having resilient locking means operable to normally prevent the separation of the operating member and the closure member during ordinary operation of the valve, but being adapted for readily releasing the closure member when forcible pressure or tension is manually applied in a transverse direction to the closure member so that the closure member may be moved transversely to disengage the interlocking parts of the members.

It is another object of my invention to provide a locking means for the purpose set forth in the above paragraph which locking means comprises a spring member having finger portions resiliently engaging opposite sides of the closure member to removably secure the spring member thereto, the finger portions each having an end portion adapted to frictionally engage the operating member to normally prevent the separation of the members.

In numerous types of valves with which I am familiar, the operating member or valve stem carrying the closure member is movable on an axis substantially perpendicular to the surface of the seat.

A source of constant difficulty accruing in the use of the ordinary valve is the deformation or warping of the valve seat due to expansion and contraction of the valve body caused by varying temperatures, which results in the valve seat being disposed at various angles from the perpendicular with respect to the axis of travel of the operating member. When this occurs the valve closure member is often incapable of properly adjusting itself to an intimate contact with the valve seat, which results in leakage through the closed valve. This condition is sometimes aggravated by an uneven distribution of sediment on the valve seat.

To obviate this disadvantage it is an object of my invention to provide a universal joint connection between the valve stem and the closure member so that the closure member may adjust itself to the angle of the surface of the valve seat, assuring an effective seal under varying temperatures.

It is another object of my invention to provide a connection of the character described in the above paragraph which is in the nature of a universal joint to allow the closure member to adjust itself to the surface of the valve seat, which connection comprises complemental interlocking parts on the operating member and the closure member adapted for interconnection and separation by a relatively transverse sliding movement of the members.

These and other objects will be made evident by a perusal of the following part of the specification and the appended claims in connection with the accompanying drawing.

In the drawing,

Fig. 1 is a longitudinal section of the valve of the invention, this view being taken on a median plane.

Fig. 2 is a transverse section taken as indicated by the line 2—2 of Fig. 1.

Fig. 3 is an enlarged plan view of the closure member of the invention, this view being rotated 90° with respect to the closure member shown in Fig. 2.

Fig. 4 is a plan view comparable to Fig. 3 but showing relative parts in different positions.

Fig. 5 is a section through the closure member of the invention taken as indicated by the line 5—5 of Fig. 3.

Fig. 6 is a perspective view of the closure member and the lower end of the valve stem of the invention in disengaged positions.

Referring first to Figs. 1 and 2 of the drawing, I show a valve, such as a globe valve, generally designated by the numeral 11. The globe valve 11 has been chosen merely as an illustration of the invention, and it is not to be inferred that my invention is in any way restricted to use in combination with valves of any particular type or construction.

The valve 11 includes a valve body 12 providing a fluid passage 13 extending therethrough and terminating on opposite sides of the body in internally threaded portions 14 adapted for connection in the manner shown to fluid conducting pipes 15. Suitably positioned in the passage 13 is a partition or bridge 16, formed integrally with the valve body, in which partition is provided a port 17 surrounded on one side thereof by a raised edge or rim adapted to serve as a valve seat 18. The valve seat 18 is shown as comprising an annular rim having a substantially flat seat surface. This, however, is immaterial to the invention inasmuch as the scope of my invention should undoubtedly include cupped, conical, knife edge, or bevelled valve seats in combination with any of the separate and distinct features of my invention.

Formed in the body 12 adjacent the seat 18, and preferably on an axis perpendicular to the seating surface 19 of the seat is a threaded opening 20 adapted to threadedly receive a bonnet 21 having a longitudinal bore 22 in which is formed an internally threaded portion 23. The threaded portion 23 is adapted to threadedly receive a valve operating member or valve stem 25 which projects outwardly from the outer end of the bore 22 and is provided with suitable means, such as a hand wheel 26, by which the valve stem may be rotated so that the valve stem moves inwardly and outwardly relative to the valve seat 18 on its longitudinal axis, which is substantially perpendicular to the seating surface 19 of the seat 18, this movement being operable to carry a closure member 27 of the invention, secured to the valve stem 25, into and out of engagement with the seat 18.

Formed on the outer end of the bonnet 21 are external threads 28 adapted for association with a packing nut of any suitable type, indicated at 29.

Although I have, for the sake of illustration, shown the valve operating member 25 as threadedly engaging the bonnet 21 and being adapted for longitudinal movement by reason of this threaded engagement, it should be clear that my invention should not be limited to this immaterial detail of construction, but should embrace combinations including any movable operating means, whether rotatable or otherwise, adapted to carry the closure member 27 into and out of intimate engagement with the seat 18.

Coming now to a description of the more pertinent details of the invention including the closure member 27, I show the inner end 30 of the valve stem 25 as being provided with a cylindrical portion 31, upon the extreme end surface 32 of which is formed a substantially semi-circular bead 33. Formed through the portion 31 adjacent the extremity 32 thereof is a transversely extending bore 35.

The closure member 27 comprises preferably a cylindrical body portion 38 having a cup-shaped depression 39 in one end surface thereof adapted to receive a suitable closure disc 40 formed preferably of rubber or other suitable material adapted to form a fluid-tight seal when brought into intimate engagement with the seat 18.

Formed in the opposite end surface of the body portion is a transversely extending slot 50 having side walls 51, a bottom wall 52 and one end wall 53 closing one end of the slot 50 on one side of the longitudinal axis A—A of the body portion 38, as best shown in Figs. 3 to 6, inclusive. The portion of the body 38 in which the slot 50 is formed may be of a reduced diameter relative to the portion of the body having the disc receiving depression 39, as shown, or the body may be of one diameter throughout the length thereof, depending on the diameter of the seat provided in the particular valve body utilized in combination with the closure member 27.

Projecting from the end wall 53 is a pin 54 which extends longitudinally of the slot 50 and the longitudinal axis of which intersects at right angles the axis A—A of the body portion 27.

Formed in the periphery of the body portion 27 substantially in the same plane as the pin 54, is an annular groove 55 provided for the purpose of supporting a lock means comprising a spring wire shaped to provide a pair of resilient finger portions 56 which are received by the annular groove 55 and which resiliently conform to the curve thereof, so that the lock means may be quickly and easily removed from the closure member for cleaning, adjustment, or for replacement without disturbing other parts of the valve. The extreme ends 57 and 58 of the finger portions 56 are bent sharply inward so as to project laterally into the slot 50 adjacent the open outer end 60 thereof, as shown. The portion of the spring wire connecting the finger portions 56 is formed into a loop 61 serving as a grasping means utilized in the following manner.

The grasping means 61 may be grasped in the fingers of the hand and the closure member positioned relative to the cylindrical end portion 31 of the valve stem 30 so that the pin 54 is in a position to be received by the transverse bore 35, whereupon the closure member is slid transversely relative to the valve stem, as indicated by the arrow B of Fig. 4, so that the slot 50 receives the cylindrical end portion 31 of the valve stem 30 substantially in the manner shown in Fig. 4.

The closure member 27 is resiliently retained on the valve stem in relatively coaxial alignment therewith by the curved end portions 57 and 58 of the fingers 56 which engage the cylindrical surface of the portion 31 in the manner shown in Figs. 2 and 4. The relation between the diameter of the transverse slot 35 and the pin 54, the point of contact between the semicircular bead 33 of the stem 30 and the bottom wall 52 of the slot 50, and the relation between the width of the slot 50 and the diameter of the portion 31 of the valve stem 30, is such that the closure member is capable of a universal-joint action, and thus is capable of adapting itself for intimate contact with the valve seat 18 even though the surface 19 thereof is disposed at an angle other than perpendicular to the longitudinal axis of the valve stem 30.

To remove the closure member 27 from the valve stem 30, it is only necessary to manually apply a tension in a direction opposite to that of the arrow B of Fig. 4 to withdraw the closure member from the valve stem, the cylindrical surface of the end portion 31 acting as cam surfaces to flex the fingers 56 outwardly, as indicated by the dotted lines 65 of Fig. 4, to allow the separation of the portion 31 and the slotted closure member portion.

For convenience of removing the closure member 27, after the valve 11 is assembled and in use, I provide an opening 66 in the valve body 12, best shown in Fig. 2, this opening being preferably positioned at 90° to the pipes 15 and the axis thereof being perpendicular to the central axis of the seat 18. The opening 66 is normally closed by a plug 67 which may be quickly and easily removed to allow access to the grasping means 61 so that the closure member 27 may be removed and replaced without dismantling the bonnet 21 from the valve.

It is, of course, understood that where it is not convenient to provide the opening 66, due to the shape and size of the valve body utilized, my invention still affords a superior and more convenient manner of connecting the closure member to the valve stem, it being only necessary to remove the bonnet and dismount the closure member 27 from the valve stem as described above without the necessity of manipulating one or more nuts or screws as in the ordinary valve.

Although I have shown only one complete embodiment of my invention, it should be understood that I do not wish to limit the scope of my invention to the details of construction as shown, as various features of the invention are adapted for separate and independent use and for use in combinations which do not include all the parts which were described as an illustration of the invention.

I claim as my invention:

1. In a valve, the combination of: a valve body having walls forming a passage therethrough in which passage is formed a valve seat having a central axis; a closure means adapted to contact said seat; an operating member for carrying said closure means; interlocking means including a bore formed in said operating member and a pin on said closure means adapted for interengagement by a relative sliding movement transversely with respect to said axis; and an opening formed in the wall of said valve body and closed by a removable plug through which opening said closure means is grasped for removal from said operating member.

2. In a valve, the combination of: a valve body having walls forming a passage therethrough in which passage is formed a valve seat having a central axis; a closure means adapted to contact said seat; an operating member for carrying said closure means; interlocking means including complemental parts on said closure means and said operating member, said complemental parts comprising a bore formed in said operating member and a pin carried by said closure means, adapted for interengagement by a relative sliding movement transversely with respect to said axis; lock means normally preventing said transverse movement of said closure means relative to said operating member when said closure means and said operating member are interlocked; grasping means associated with said lock means and operable to release said lock means by a tension applied thereto in said transverse direction; and an opening formed in the wall of said body and closed by a removable plug through which opening said grasping means is accessible.

3. In a valve, the combination of: a valve body having walls forming a passage therethrough in which passage is formed a valve seat; a closure means adapted to contact said seat; a movable operating member including a closure supporting portion having a longitudinal axis; interlocking means comprising a bore formed in said operating member and a pin carried by said closure means adapted for sliding interengagement by a relative movement transversely with respect to said longitudinal axis; lock means normally preventing said transverse movement of said closure means relative to said operating member when said closure means and said operating member are interlocked; grasping means associated with said lock means and operable to release said lock means by a tension applied thereto in said transverse direction; and an opening formed in the wall of said body and closed by a removable plug through which said grasping means is accessible for the purpose of removing said closure means from said operating member.

4. In a valve, the combination of: a valve body having walls forming a passage therethrough in which passage is formed a valve seat having a central axis; a closure means adapted to contact said seat; an operating member for carrying said closure means; a universal joint connection between said closure means and said operating member including complemental parts comprising a bore formed in one of said two last-mentioned elements and a pin carried by the other of said elements adapted for non-rotatable interengagement by a relative sliding movement transversely with respect to said axis; and releasable locking means for normally preventing the separation of said interengaging parts.

5. In a valve, the combination of: a valve body having walls forming a passage therethrough in which passage is formed a valve seat having a central axis; a closure means adapted to contact said seat; an operating member for carrying said closure means; a universal joint connection between said closure means and said operating member including complemental parts comprising a bore formed in one of said two last-mentioned elements and a pin carried by the other of said elements adapted for non-rotatable interengagement by a relative sliding movement transversely with respect to said axis; lock means normally preventing said transverse movement of said closure means relative to said operating member when said closure means and said operating member are interlocked; grasping means associated with said lock means and operable to release said lock means by a tension applied thereto in said transverse direction; and an opening formed in the wall of said body and closed by a removable plug through which said opening said grasping means is accessible.

6. In a valve, the combination of: a valve body having walls forming a passage therethrough in which passage is formed a valve seat having a central axis; a closure means adapted to contact said seat; an operating member for carrying said closure means; a universal joint connection between said closure means and said operating member including complemental parts comprising a bore formed in one of said two last-mentioned elements and a pin carried by said other element adapted for non-rotatable interengagement by a relative sliding movement transversely with respect to said axis; resilient means carried by said closure means having parts contacting said operating member when said complemental parts are interengaged to normally prevent said transverse movement of said closure means relative to said operating member when said member and said means are interlocked, and having a grasping part to which a tension may be manually applied in said transverse direction to overcome the resistance of said contacting parts and move said closure means in said transverse direction; and an opening formed in the wall of said body and closed by a removable plug through which opening said grasping means is accessible for the purpose of removing said closure means from said operating member.

7. In a sealing means adapted for use in a valve, the combination of: a closure member adapted to intimately contact a surface and having a given axis substantially perpendicular to said surface when said member contacts said surface; a supporting member for carrying said closure member; and interlocking means comprising a pin carried by said closure member and a bore formed in said supporting member adapted for interengagement by a relative sliding movement transversely with respect to said axis.

8. In a sealing means adapted for use in a valve, the combination of: a closure member adapted to intimately contact a surface and having a given axis substantially perpendicular to said surface when said member contacts said surface; a supporting member for carrying said closure member; a universal joint connection between said closure member and said supporting member including complemental parts comprising a bore formed in one of said two last-mentioned members and a pin carried by the other of said members adapted for non-rotatable interengagement by a relative sliding movement transversely with respect to said axis; and releasable locking means for normally preventing the separation of said interengaging parts.

9. In a sealing means adapted for use in a valve, the combination of: a closure member adapted to intimately contact a surface; a supporting member movable on a given axis substantially perpendicular to said surface for carrying said closure member; and a universal joint connection between said supporting member and said closure member including complemental parts comprising a bore formed in one of said two last-mentioned members and a pin carried by the other of said members adapted for non-rotatable interengagement by sliding movement of said closure member relative to said supporting member in a transverse direction with respect to said axis, said universal joint connection being provided for the purpose of allowing an intimate contact between said closure member and said surface when said surface is disposed in a plane other than truly perpendicular to said axis.

10. In a sealing means adapted for use in a valve, the combination of: a closure member adapted to intimately contact a surface; a supporting member movable on a given axis substantially perpendicular to said surface for carrying said closure member; a universal joint connection between said supporting member and said closure member comprising complemental parts on said two last-mentioned members adapted for non-rotatable interengagement by a sliding movement of said closure member relative to said supporting member in a transverse direction with respect to said axis, said universal joint connection being provided for the purpose of allowing an intimate contact between said closure member and said surface when said surface is disposed in a plane other than truly perpendicular to said axis; and a locking element removably secured to said closure member and comprising resilient means contacting said supporting member for normally preventing said relative transverse movement of said members when said members are interlocked and grasping means to which a tension may be manually applied in said transverse direction to overcome the resistance of said resilient contacting means and move said closure member in said transverse direction to disengage said members.

11. In a sealing means adapted for use in a valve, the combination of: a closure member having a longitudinal axis and adapted to intimately contact a surface; supporting means including an elongated stem movable on a given axis substantially perpendicular to said surface for carrying said closure member, said stem having a substantially semicircular bead formed on the extremity thereof adjacent said surface; a lateral bore extending through said stem adjacent said extremity thereof; cam surfaces formed on opposite sides of said stem with respect to the longitudinal axis of said bore; a transversely extending slot in one end of said closure member having side walls, a bottom wall, and terminating in a closed end wall on one side of said closure member, said slot being adapted to receive said extremity of said stem in a relative sliding motion in a transverse direction with respect to the longitudinal axes of said stem and said closure member; a pin projecting from said end wall of said slot and adapted to extend into said bore to prevent relative rotational movement of said stem and said member, the relation of said bead to said bottom of said slot, said stem to said side walls of said slot and said pin to said bore being such that said closure member is capable of a universal pivoting motion relative to said stem; and a locking element carried by said closure member including resilient means contacting said cam surfaces of said stem when said closure means and said stem are interengaged to normally prevent the separation thereof and said resilient means being flexed by said cam surfaces to allow said closure means to separate from said stem when said closure member is forcibly moved in said transverse direction.

12. In a sealing means adapted for use in a valve, the combination of: a closure member adapted to intimately contact a surface; a supporting member movable on a given axis substantially perpendicular to said surface for carrying said closure member; a universal joint connection between said supporting member and said closure member comprising complemental parts on said two last-mentioned members adapted for non-rotatable interengagement by a sliding movement of said closure member relative to said supporting member in a transverse direction with respect to said axis, said universal joint connection being provided for the purpose of allowing an intimate contact between said closure member and said surface when said surface is disposed in a plane other than truly perpendicular to said axis; and locking means including a groove formed on two opposite sides of said closure member and a spring member shaped to provide a pair of finger portions adapted to removably secure said spring member to said closure member by a resilient engagement thereof with the walls of said groove, said finger portions each having an end portion adapted to frictionally engage said supporting member for normally preventing the separation of said interengaging members.

13. In a sealing means adapted for use in a valve, the combination of: a closure member having a longitudinal axis and adapted to intimately contact a surface; supporting means including an elongated stem movable on a given axis substantially perpendicular to said surface for carrying said closure member, said stem having a substantially semi-circular bead formed on the extremity thereof adjacent said surface; a lateral bore extending through said stem adjacent said extremity thereof; cam surfaces formed on opposite sides of said stem with respect to the longitudinal axis of said bore; a transversely extending slot in one end of said closure member having side walls, a bottom wall, and terminating in a closed end wall on one side of said closure member, said slot being adapted to receive said extremity of said stem in a relatively transverse sliding motion with respect to the longitudinal axes of said stem and said closure member; a pin projecting from said end wall of said slot and adapted to extend into said bore to prevent relative rotational movement of said stem and said member, the relation of said bead to said bottom of said slot, said stem to said side walls of said slot, and said pin to said bore being such that said closure member is capable of a universal pivoting motion relative to said stem; and locking means including a groove formed on two opposite sides of said closure member and a spring member shaped to provide a pair of finger portions adapted to removably secure said spring member to said closure member by a resilient engagement thereof with the walls of said groove, said finger portions each having an end portion adapted to frictionally engage said cam surfaces of said stem when said closure means and said stem are interengaged to normally prevent the separation thereof and said resilient means adapted to be flexed by said cam surfaces to allow said closure means to separate from said stem when said closure member is forcibly moved in said transverse direction.

14. In an apparatus of the character described, an operating stem, a member having an upstanding portion fitted about said stem and open at one side to permit the stem to pass therein, and having an external groove thereon, means to secure said stem to said member comprising a resilient wire adapted to lie in said groove and having its ends bent inwardly in overlapping relation to said upstanding portion and bearing upon said stem, and grasping means for removing said member.

15. In an apparatus of the character described, an operating stem, a closure member carried by the stem and adapted to be removed therefrom by a transverse movement relative thereto, a spring engaging the stem and yieldingly holding the closure member against transverse movement relative to the stem and providing an opening for passage of the stem therethrough.

16. In a sealing means, the combination of a closure member, a supporting member for carrying said closure member, said closure member having limited movement longitudinally of said supporting member, and spring means directly in contact with said supporting member and normally locking the closure member against movement transverse of said supporting member and permitting removal thereof laterally from said supporting member.

17. In a sealing means, the combination of a closure member, a supporting member for carrying said closure member, and spring means directly in contact with said supporting member and normally locking said closure member against movement transverse of said supporting member and permitting removal thereof laterally from said supporting member.

18. In an apparatus of the character described, an operating stem, a member having an upstanding portion fitted about said stem and having a groove surrounding the stem and opened at one side, and means for securing said stem to said member comprising a resilient wire adapted to lie in said groove and having its ends bent inwardly at said opening to bear upon said stem, and providing an opening between the ends to provide for passage of the stem therebetween.

ROY E. JOYCE.